United States Patent
Wu et al.

(10) Patent No.: US 8,276,549 B2
(45) Date of Patent: *Oct. 2, 2012

(54) FLEXIBLE FUEL VARIABLE BOOST SUPERCHARGED ENGINE

(75) Inventors: Ko-Jen Wu, Troy, MI (US); James C. Elmslie, Oxford, MI (US); Jian Jun Zhang, Rochester, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 595 days.

This patent is subject to a terminal disclaimer.

(21) Appl. No.: 12/031,813

(22) Filed: Feb. 15, 2008

(65) Prior Publication Data
US 2009/0044532 A1 Feb. 19, 2009

Related U.S. Application Data

(60) Provisional application No. 60/956,528, filed on Aug. 17, 2007.

(51) Int. Cl.
| | |
|---|---|
| F02B 43/00 | (2006.01) |
| F02B 47/00 | (2006.01) |
| F02B 33/00 | (2006.01) |
| F02M 25/00 | (2006.01) |
| F02M 51/00 | (2006.01) |
| F02D 23/00 | (2006.01) |
| G06F 7/00 | (2006.01) |
| G06F 17/00 | (2006.01) |
| B60W 10/04 | (2006.01) |
| B60W 10/10 | (2012.01) |

(52) U.S. Cl. ............ 123/1 A; 123/559.1; 123/564; 123/488; 123/561; 60/601; 701/51; 701/103; 477/115

(58) Field of Classification Search ........... 60/606–609, 60/601; 123/559.1–564, 406.37, 198 A, 123/514, 1 A; 701/103, 105, 51, 113; 324/663, 324/690; 385/12; 702/25, 52; 356/128, 356/133; 44/451; 477/3, 115
See application file for complete search history.

(56) References Cited

U.S. PATENT DOCUMENTS

| 2,922,314 A * | 1/1960 | Johnson et al. ........... 123/561 |
| 3,270,730 A * | 9/1966 | Timoney ................. 123/561 |
| 4,492,203 A * | 1/1985 | Yutaka .................. 123/559.1 |

(Continued)

FOREIGN PATENT DOCUMENTS
CN 1499056 A 5/2004
(Continued)

OTHER PUBLICATIONS

S. George, G. Morris, J. Dixon, D. Pearce and G. Helsop; Optimal Boost Control for an Electrical Supercharging Application; SAE 2004-01-0523.

(Continued)

Primary Examiner — Thai Ba Trieu

(57) ABSTRACT

The present invention provides a flexible fuel, spark ignition, variable boost, supercharged internal combustion engine. A variable speed drive assembly connects the engine output to a supercharger. The engine includes a fuel sensor which provides a signal to an engine controller which determines the type of fuel. The engine controller also receives signals from a mass air flow sensor, a manifold air pressure sensor, a crank angle sensor, a camshaft angle sensor, an oxygen sensor in the exhaust stream and a transmission controller. The engine controller provides control signals to an ignition module, to a fuel injection system, to an electronic throttle control, to a supercharger drive controller and to the transmission controller.

23 Claims, 3 Drawing Sheets

U.S. PATENT DOCUMENTS

| | | | |
|---|---|---|---|
| 4,498,443 A * | 2/1985 | Hasegawa et al. | 60/605.1 |
| 4,757,686 A * | 7/1988 | Kawamura et al. | 60/608 |
| 4,815,437 A * | 3/1989 | Regar | 123/564 |
| 5,117,799 A | 6/1992 | Suzuki et al. | 123/561 |
| 5,121,986 A * | 6/1992 | Rutz | 356/133 |
| 5,363,314 A * | 11/1994 | Kobayashi et al. | 702/25 |
| 5,365,908 A * | 11/1994 | Takii et al. | 123/564 |
| 5,427,079 A * | 6/1995 | Andrepont et al. | 123/561 |
| 5,803,047 A * | 9/1998 | Rask | 123/406.37 |
| 5,839,416 A * | 11/1998 | Kruiswyk et al. | 123/559.2 |
| 5,881,559 A * | 3/1999 | Kawamura | 60/597 |
| 5,890,468 A * | 4/1999 | Ozawa | 123/561 |
| 5,992,386 A * | 11/1999 | Nytomt et al. | 123/406.37 |
| 6,227,180 B1 * | 5/2001 | Hoffmann et al. | 123/564 |
| 7,000,601 B2 * | 2/2006 | Yasui et al. | 123/559.3 |
| 7,082,932 B1 * | 8/2006 | Crane | 123/559.1 |
| 7,225,787 B2 * | 6/2007 | Bromberg et al. | 123/198 A |
| 7,426,925 B2 * | 9/2008 | Leone et al. | 123/1 A |
| 7,542,879 B2 * | 6/2009 | Grichnik et al. | 123/488 |
| 7,721,710 B2 * | 5/2010 | Leone et al. | 123/1 A |
| 7,789,074 B2 * | 9/2010 | Tashima | 123/514 |
| 7,861,694 B2 * | 1/2011 | Tashima | 123/514 |
| 7,942,128 B2 * | 5/2011 | Leone et al. | 123/1 A |
| 2006/0137340 A1 | 6/2006 | Stewart | |
| 2006/0218923 A1 * | 10/2006 | Sopko et al. | 60/607 |
| 2006/0250902 A1 | 11/2006 | Bender et al. | |
| 2007/0125083 A1 | 6/2007 | Rollinger et al. | |
| 2008/0168966 A1 * | 7/2008 | Bromberg et al. | 123/528 |
| 2008/0269996 A1 * | 10/2008 | Imamura et al. | 701/51 |
| 2009/0048745 A1 * | 2/2009 | Wu et al. | 701/51 |
| 2009/0078237 A1 * | 3/2009 | Tashima | 123/514 |
| 2009/0234561 A1 * | 9/2009 | Marriott et al. | 701/105 |
| 2009/0319195 A1 * | 12/2009 | Hoots et al. | 702/25 |
| 2010/0031935 A1 * | 2/2010 | VanDyne et al. | 123/559.1 |
| 2010/0057331 A1 * | 3/2010 | Yamashita | 701/103 |
| 2010/0065016 A1 * | 3/2010 | Bromberg et al. | 477/115 |
| 2010/0080502 A1 * | 4/2010 | Nishikawa et al. | 385/12 |
| 2010/0101140 A1 * | 4/2010 | Hoots et al. | 44/451 |
| 2010/0138086 A1 * | 6/2010 | Imamura et al. | 701/113 |
| 2010/0197449 A1 * | 8/2010 | Imamura et al. | 477/3 |
| 2010/0224170 A1 * | 9/2010 | Tashima | 123/514 |
| 2010/0288232 A1 * | 11/2010 | Bromberg et al. | 123/445 |
| 2010/0296080 A1 * | 11/2010 | Nishikawa et al. | 356/128 |

FOREIGN PATENT DOCUMENTS

| | | | |
|---|---|---|---|
| DE | 3801227 A | * | 11/1988 |
| GB | 2398108 A | * | 8/2004 |
| JP | 4-194322 A | | 7/1992 |

OTHER PUBLICATIONS

Koichi Nakata, Shintaro Utsumi, Atsuharu Ota, Katsunori Kawatake, Takashi Kawai, and Takashi Tsunooka; The Effect of Ethanol Fuel on a Spark Ignition Engine; SAE 2006-01-3380.

Hitoshi Takahashi, Takeya Harada, Toshihiro Yamaki, and Toshihiro Oikawa; Study on Impulse Charger for Enhancement of Volumetric Efficiency of SI Engine; SAE 2006-01-0191.

Faith Sarikoc, Maurice Kettner, Amin Velji, Ulrich Spicher, Alina Krause, and Alfred Elsaesser; Potential of Reducing the NOX Emissions in a Spray Guided DI Gasoline Engine by Stratified Exhaust Gas Recirculation (EGR); SAE 2006-01-1261.

* cited by examiner

FLEXIBLE FUEL VARIABLE BOOST SUPERCHARGED ENGINE

CROSS-REFERENCE TO RELATED APPLICATIONS

This application claims the benefit of U.S. Provisional Application No. 60/956,528, filed on Aug. 17, 2007. The disclosure of the above application is incorporated herein by reference.

FIELD

The present disclosure relates to a flexible fuel, supercharged internal combustion engine and more particularly to a flexible fuel, supercharged internal combustion engine having variable boost.

BACKGROUND

The statements in this section merely provide background information related to the present disclosure and may or may not constitute prior art.

Internal combustion engines, particularly those configurations utilized in passenger car and light truck applications, have been the subject of extensive and exhaustive development effort. One of the more recent results of such effort involves the operation of an internal combustion engine as a flexible fuel engine, i.e., an engine operating on a variety of fuels, most commonly gasoline and E85 (a mixture of 85 percent ethanol (grain alcohol) and 15 percent gasoline). While a flexible fuel engine presently offers certain advantages from the standpoints of fuel expense and the larger issue of foreign oil dependency, there are operational issues which are the subject of significant contemporary research and development.

For example, spark ignition internal combustion engines operating on ethanol or E85 have better knock tolerance when operating under wide open throttle or full load conditions than the same engine operating on gasoline. Because by its very nature the flexible fuel engine must operate on a variety of fuels, its operation on ethanol is very often compromised. Improving the performance and efficiency of a flexible fuel engine operating on ethanol is thus an important goal and the goal to which this invention is directed.

SUMMARY

The present invention provides a flexible fuel, spark ignition, variable boost, supercharged internal combustion engine. A variable speed drive assembly connects the engine output to a supercharger. The variable speed drive assembly may be either a continuously variable or a step, i.e., two speed, device. The intake manifold may also include a supercharger bypass which selectively connects the air duct upstream of the supercharger to the intake plenum downstream of the supercharger.

The engine includes a fuel sensor which provides a signal to a master engine controller which determines the type of fuel. The master engine controller also receives signals from a mass air flow sensor, a manifold air pressure sensor, a crankshaft angle sensor, a camshaft angle sensor, an oxygen sensor in the exhaust stream and a transmission controller. The master engine controller provides control signals to an ignition module, a fuel injection system, an electronic throttle control, a supercharger drive controller and the transmission controller.

When the internal combustion engine is fueled with gasoline, the operation of the supercharger will generally be somewhat limited. In fact, during low load and speed conditions, it may be desirable to disengage the supercharger to prevent any manifold pressure boost.

When the engine controller senses that the engine is fueled with ethanol, E85 or another ethanol/gasoline blend, this information, in conjunction with other signals, is utilized to set a target boost pressure. The actual manifold pressure or a signal representing the speed of the supercharger can be used as a feedback signal for supercharger speed control. The maximum supercharger boost levels for each fuel as a function of engine speed are stored in memory in the engine controller. If the desired engine torque is sufficiently high, the supercharger speed and boost are increased by adjustment of the variable speed drive assembly to boost the volumetric efficiency of the engine to a level that better matches the fuel octane characteristics.

Thus it is an object of the present invention to provide a flexible fuel, spark ignition, variable boost, supercharged internal combustion engine for use in motor vehicles.

Further objects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
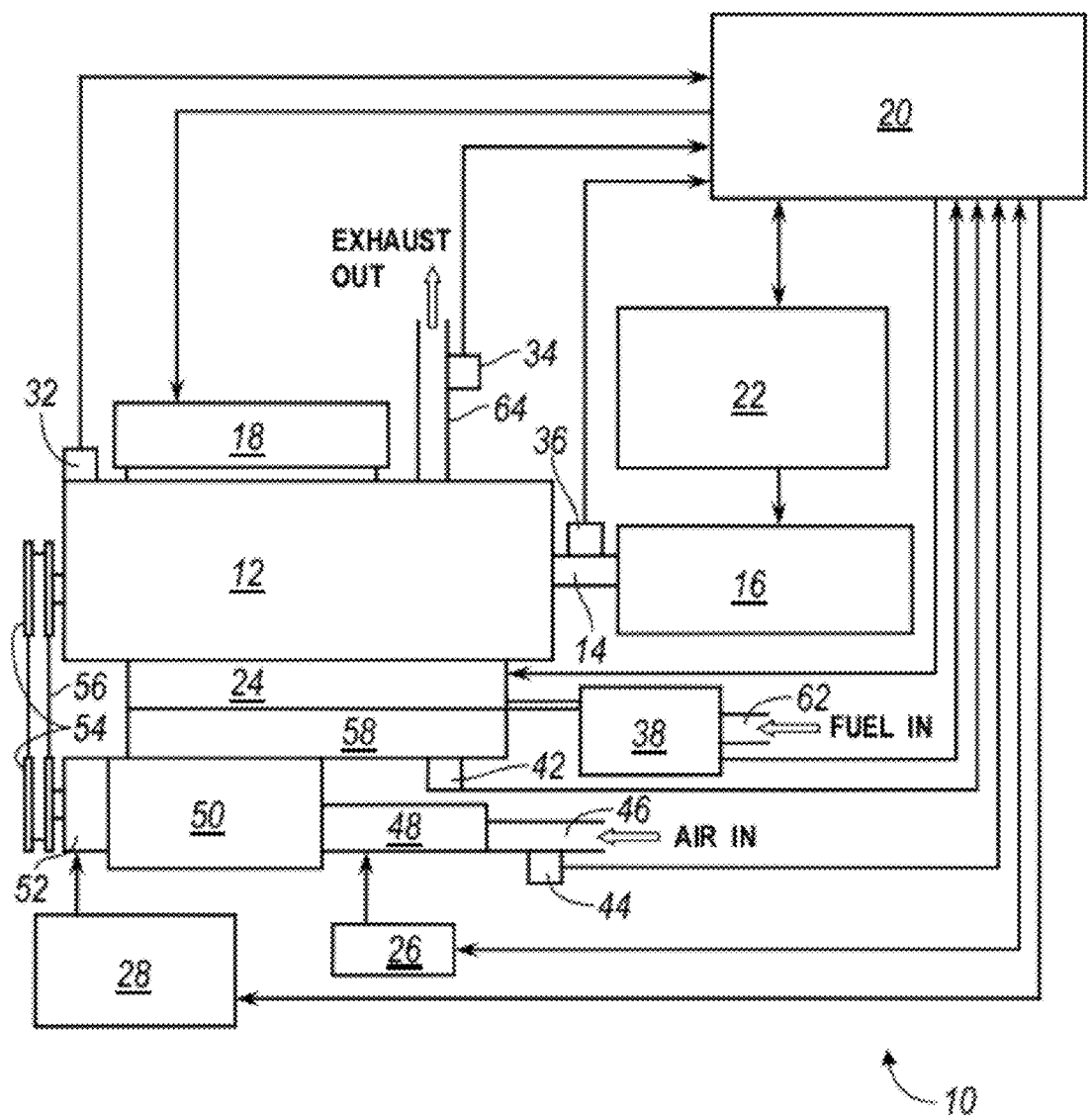
FIG. 1 is a diagrammatic illustration of a first embodiment of a flexible fuel, supercharged, variable boost, internal combustion engine assembly according to the present invention.

With reference to FIG. 1, a first embodiment of a flexible fuel, spark ignition, supercharged, variable boost, internal combustion engine assembly according to the present invention is illustrated and generally designated by the reference number 10. The flexible fuel internal combustion engine assembly 10 includes an internal combustion engine 12 typically having four, six or eight pistons and cylinders and a crankshaft or output shaft 14 which directly drives a multiple speed, typically automatic transmission 16 which, in turn, drives a final drive arrangement (not illustrated). Operatively associated with the internal combustion engine 12 is an ignition system 18 which is controlled by a master engine controller 20. The master engine controller 20 also provides data to and controls a transmission controller 22, a fuel injection system 24, an electronic throttle control 26 and a supercharger drive controller 28. The fuel injection system 24 may be either port or direct (in cylinder) injection type.

The master engine controller 20 also receives a plurality of data signals from: a camshaft angle sensor 32, an exhaust gas (oxygen) sensor 34, a crankshaft angle sensor 36, a fuel sensor 38, a manifold air pressure (MAP) sensor 42 and a mass air flow (MAF) sensor 44. The mass air flow sensor 44 is located in an air inlet duct 46 upstream of a throttle assembly 48. Downstream of the throttle assembly 48 is a supercharger 50 which is driven through a variable speed drive assembly 52 from the crankshaft or output shaft 14 of the internal combustion engine 12 by suitable pulleys 54 and a belt 56 or other mechanical connection. Alternatively, energy may be supplied to the supercharger 50 by an electric motor (not illustrated) or a combination of both the engine 12 and the electric motor.

The variable speed drive assembly 52 may be either a continuously variable type or may provide stepped or two speed operation: direct drive and a fixed speed increase. Thus, it may include a CVT or planetary gear type drive assembly which is controlled electrically or hydraulically. In any case, the typical maximum speed ratio increase will be on the order of 1 to 2.5 to 1.0 to 4.0 although a lower minimum (speed increase) ratio or a higher maximum (speed increase) ratio may be dictated by certain applications. The inlet (suction) side of the supercharger 50 is connected to the air inlet duct 46 and the outlet (pressure) side of the supercharger 50 is connected to an intake manifold 58 in which the manifold air pressure sensor 42 resides.

Fuel in a fuel line 62 is provided to the fuel sensor 38 and thence to the fuel injection system 24 and such fuel and air from the intake manifold 58 is provided to the internal combustion engine 12. An exhaust manifold 64 secured to the engine 12 contains the exhaust gas sensor 34 and routes exhaust gasses to an exhaust system (not illustrated).

Figure 2:
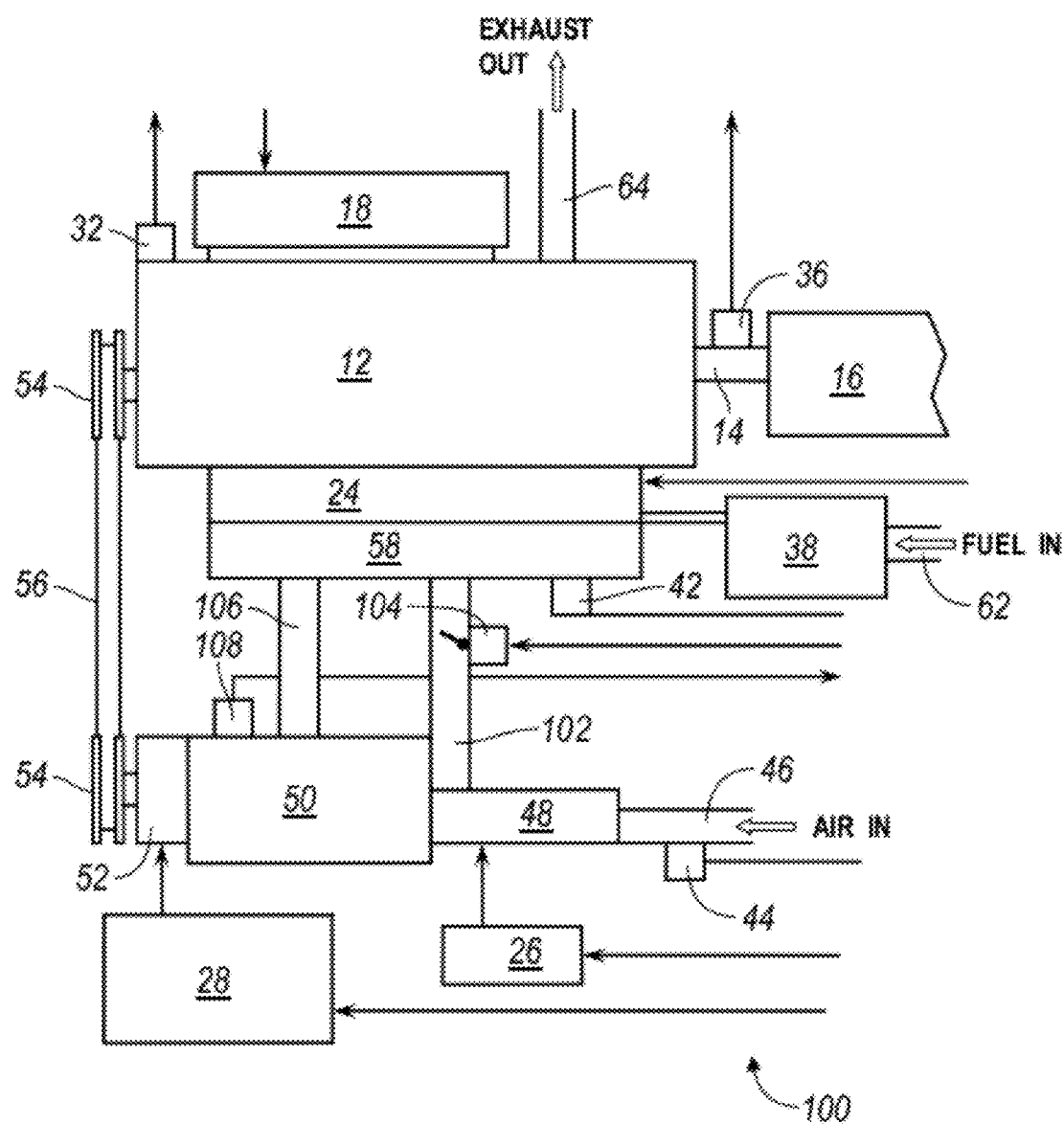
FIG. 2 is an enlarged, diagrammatic view of a portion of another embodiment of a flexible fuel, supercharged, variable boost, internal combustion engine assembly according to the present invention.
Figure 3:
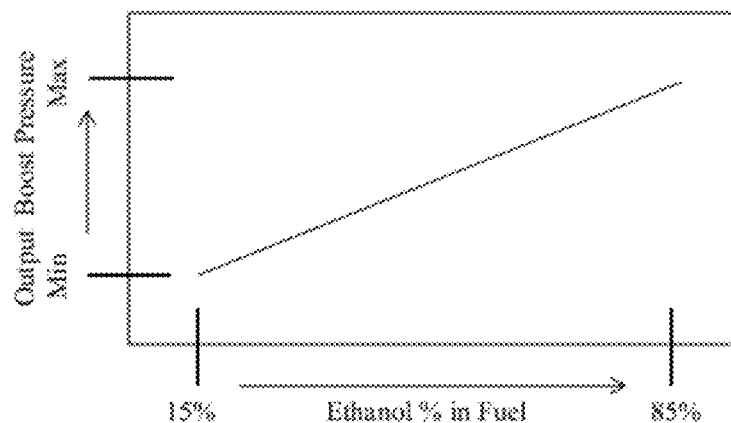
FIG. 3 is a graph depicting the relationship between a output boost pressure of a supercharger and the relative ratio of ethanol in a fuel mixture according to the present invention.
Figure 4:
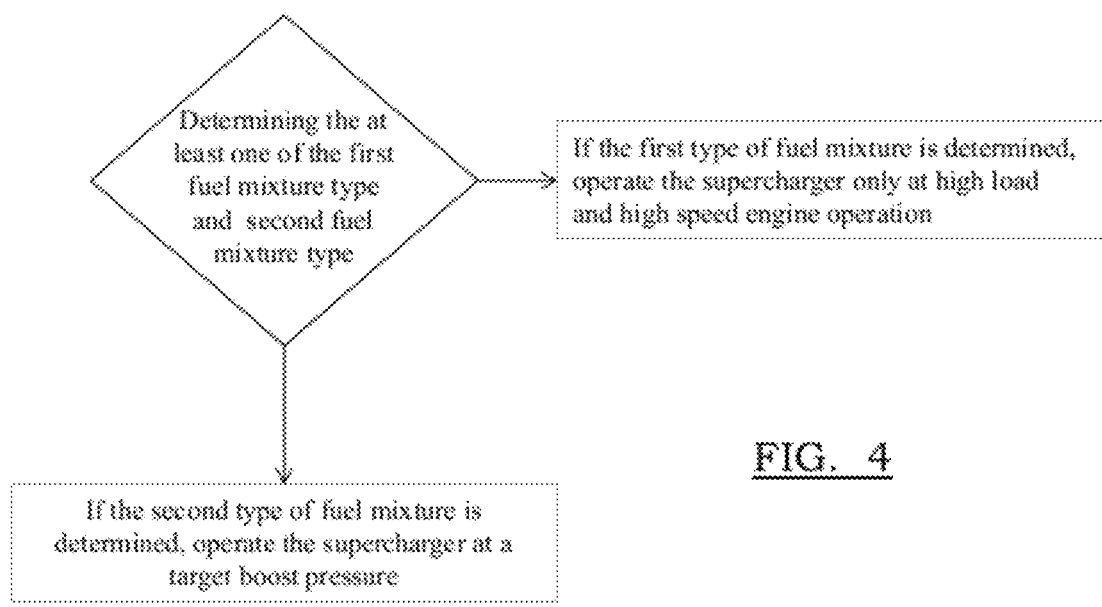
FIG. 4 is a flowchart of a software algorithm process according to the present invention.

Referring now to FIG. 2, a partial view of another embodiment of a flexible fuel, spark ignition, supercharged, variable boost, internal combustion engine assembly according to the present invention is illustrated and generally designated by the reference number 100. In the other embodiment of the flexible fuel, spark ignition, supercharged, variable boost, internal combustion engine assembly 100, a bypass duct 102 extends from and communicates between the portion of the inlet air duct 46 downstream of the throttle assembly 48 and the intake manifold 58. A two position or fully modulatable bypass valve 104 is controlled by the master engine controller 20 (illustrated in FIG. 1) and controls the quantity of air bypassing the supercharger 50. The bypass valve 104 is especially useful to control air flow in conjunction with a two speed variable speed drive assembly 52. A primary air duct 106 communicates between the output of the supercharger 50 and the intake manifold 58. Finally, a supercharger speed sensor 108 may be utilized to provide data or a signal to the master engine controller 20 regarding the speed of the shaft (not illustrated) of the supercharger 50. It should be understood that those components of the first embodiment of the flexible fuel, spark ignition, supercharged, variable boost, internal combustion engine assembly 10 illustrated in FIG. 1 but not illustrated in FIG. 2 are nonetheless components included and utilized in the other embodiment 100 illustrated in FIG. 2 and that they function the same as those components illustrated in FIG. 1.

With reference now to FIGS. 1 and 2, the operation of a flexible fuel, spark ignition, supercharged, variable boost, internal combustion engine assemblies 10 and 100 according to the present invention will now be described. Fuel is supplied in the fuel line 62 to the fuel sensor 38 which provides data or a signal to the master engine controller 20 from which it is determined what type of fuel or blend of fuels is currently being provided to the internal combustion engine assembly 10. Alternatively, the master engine controller 20 may contain a software algorithm which determines the type of fuel or blend based upon sensed engine and operating conditions. If it is determined that the fuel is gasoline, operation of the supercharger 50 will typically be limited to, at most, high load, high speed operation. The maximum boost pressure for gasoline as a function of engine speed is stored in memory in the master engine controller 20. In many applications with gasoline, the bypass valve 104 may be utilized and opened and operation of the supercharger 50 may be disabled to avoid any manifold pressure boost.

If the fuel sensor 38 senses or provides data indicating the presence and relative ratio of ethanol, the master engine controller 20, in conjunction with other data signals, sets a target boost pressure. The manifold pressure sensed by the manifold air pressure sensor 42 or a signal from the supercharger speed sensor 108 may be utilized as a feedback signal to control the speed of the supercharger 50 and thus the pressure in the intake manifold 58. The maximum permissible boost pressures for each type or blend of fuel as a function of engine speed are stored in memory in the master engine controller 20.

When ethanol is present in the fuel and the desired torque of the engine 12 is sufficiently high, the speed of the supercharger 50 will be raised from those speeds associated with gasoline by controlling the variable speed drive assembly 52 to increase the pressure of air delivered to the intake manifold 58 to boost the volumetric efficiency of the engine 12 to a level that better matches the fuel octane characteristics. Manifold pressure (boost) in the range of from 2.5 bar to 3.0 bar absolute are suitable for fuels containing ethanol and many operating conditions although it should be understood that this range is provided by way of example only and that various operating conditions and parameters as well as diverse performance goals will typically widen this range. Additionally, the spark timing controlled by the ignition system 18 and the duration of fuel injection pulses controlled by the fuel injection system 24, both under the control of the master engine controller 20, are adjusted accordingly for the extra air flow and fuel type. Finally, the master engine controller 20 will typically generate commands to the transmission controller 22 to adjust the shift point schedule of the automatic transmission 16 and the lockup schedule of a torque converter (not illustrated) to optimize vehicle performance and fuel economy.

The foregoing description of the invention is merely exemplary in nature and variations that do not depart from the gist of the invention are intended to be within the scope of the invention. Such variations are not to be regarded as a departure from the spirit and scope of the invention.

What is claimed is:

1. A flexible fuel, supercharged internal combustion engine assembly comprising:
   an internal combustion engine having an intake manifold and an output shaft, wherein the engine uses a fuel mixture of ethanol and gasoline,
   a supercharger having an input shaft and an output boost pressure provided to said intake manifold,
   a variable speed drive assembly operably disposed between said output shaft and said input shaft,
   a plurality of sensors including at least a fuel sensor and a mass air flow sensor, wherein the fuel sensor detects a relative ratio of ethanol to the fuel mixture of ethanol and gasoline, and
   a master engine controller having a plurality of inputs for receiving data from said plurality of sensors and at least one output for controlling said variable speed drive assembly,
   wherein the master engine controller sets a target output boost pressure when the fuel sensor detects the relative ratio of ethanol to the fuel mixture of ethanol and gasoline.

2. The flexible fuel, supercharged internal combustion engine assembly of claim 1 wherein said variable speed drive assembly includes an adjustable speed increasing portion and a control portion for receiving said at least one output of said master engine controller.

3. The flexible fuel, supercharged internal combustion engine assembly of claim 1 wherein said plurality of sensors further includes a manifold air pressure sensor and an oxygen sensor.

4. The flexible fuel, supercharged internal combustion engine assembly of claim 1 wherein said plurality of sensors further includes a crank angle sensor and a camshaft angle sensor.

5. The flexible fuel, supercharged internal combustion engine assembly of claim 1 further including an automatic transmission and a transmission controller linked to said master engine controller.

6. The flexible fuel, supercharged internal combustion engine assembly of claim 1 further including a fuel injection system and an ignition system linked to said master engine controller.

7. The flexible fuel, supercharged internal combustion engine assembly of claim 1 wherein said variable speed drive assembly is one of a two speed or a continuously variable type.

8. A flexible fuel, spark ignition, supercharged internal combustion engine assembly comprising:
   an internal combustion engine having an intake manifold and an output shaft, wherein the engine uses at least one of a first fuel mixture type and a second fuel mixture type,
   a supercharger having an input shaft and an output boost pressure provided to said intake manifold,
   an adjustable drive assembly operably disposed between said output shaft and said input shaft,
   a spark ignition system,
   a plurality of sensors including at least a fuel sensor, a mass air flow sensor and a crankshaft angle sensor, and
   a master engine controller receiving a plurality of input data from said plurality of sensors and at least one output for controlling said adjustable drive assembly, and having a software algorithm stored in a non-transitory computer readable medium,
      wherein the software algorithm is to execute in:
         determining the at least one of the first fuel mixture type and second fuel mixture type,
         operating the supercharger only at high load and high speed engine operation if the first fuel mixture type is determined, and
         operating the supercharger at a target boost pressure if the second fuel mixture type is determined.

9. The flexible fuel, spark ignition, supercharged internal combustion engine assembly of claim 8 wherein said adjustable drive assembly includes a speed increasing portion and a control portion for receiving one of said outputs of said master engine controller.

10. The flexible fuel, spark ignition, supercharged internal combustion engine assembly of claim 8 wherein said plurality of sensors further includes a manifold air pressure sensor and an oxygen.

11. The flexible fuel, spark ignition, supercharged internal combustion engine assembly of claim 8 wherein said plurality of sensors further includes a camshaft angle sensor.

12. The flexible fuel, supercharged internal combustion engine assembly of claim 8 further including an automatic transmission and a transmission controller linked to said master engine controller.

13. The flexible fuel, supercharged internal combustion engine assembly of claim 8 further including a fuel injection system linked to said master engine controller.

14. The flexible fuel, supercharged internal combustion engine assembly of claim 8 wherein said adjustable drive assembly is one of a two speed or a continuously variable type.

15. The flexible fuel, supercharged internal combustion engine assembly of claim 8 further including an electronic throttle control and wherein said master engine controller includes an output linked to said electronic throttle control.

16. The flexible fuel, spark ignition, supercharged internal combustion engine assembly of claim 8 wherein said first fuel mixture type is gasoline and said second fuel mixture type includes a blend of gasoline and ethanol.

17. The flexible fuel, spark ignition, supercharged internal combustion engine assembly of claim 8 wherein said target boost pressure is 2.5 bar to 3.0 bar.

18. A flexible fuel, supercharged internal combustion engine assembly comprising, in combination,:
   an internal combustion engine having an intake manifold, a fuel injection system and an output shaft, wherein the engine uses a fuel mixture including at least one of gasoline and ethanol,
   a supercharger having an input shaft and an output boost pressure provided to said intake manifold,
   a variable speed drive assembly operably disposed between said output shaft and said input shaft,
   a plurality of sensors including at least a fuel sensor, a mass air flow sensor and a crankshaft angle sensor, and
   a master engine controller receiving a plurality of input data from said plurality of sensors and at least one output for controlling said adjustable drive assembly, and having a software algorithm stored in a non-transitory computer readable medium,
      wherein the software algorithm is to execute in:
         determining the at least one of the first fuel mixture type and second fuel mixture type,
         operating the supercharger only at high load and high speed engine operation if the first fuel mixture type is determined, and
         operating the supercharger at a target boost pressure if the second fuel mixture type is determined.

19. The flexible fuel, supercharged internal combustion engine assembly of claim 18 wherein said variable speed drive assembly provides two selectable speed ratios.

20. The flexible fuel, supercharged internal combustion engine assembly of claim 18 wherein said variable speed drive assembly includes a continuously variable transmission.

21. The flexible fuel, supercharged internal combustion engine assembly of claim 18 further including an automatic transmission and a transmission controller linked to said master engine controller.

22. The flexible fuel, supercharged internal combustion engine assembly of claim 18 further including a manifold air pressure sensor, an oxygen sensor and a crankshaft angle sensor.

23. The flexible fuel, spark ignition, supercharged internal combustion engine assembly of claim 18 wherein said target boost pressure is 2.5 bar to 3.0 bar.

\* \* \* \* \*